UNITED STATES PATENT OFFICE.

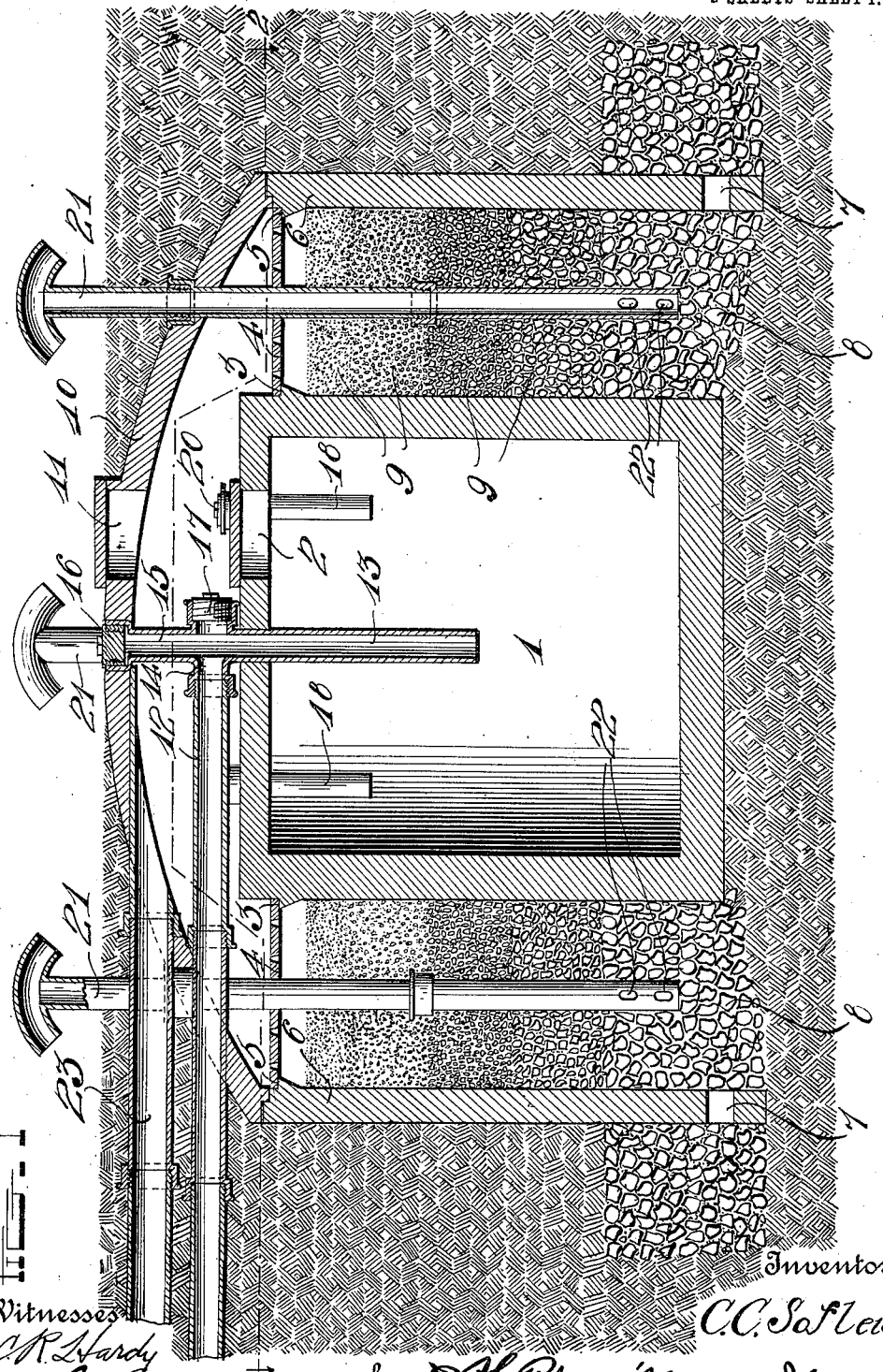

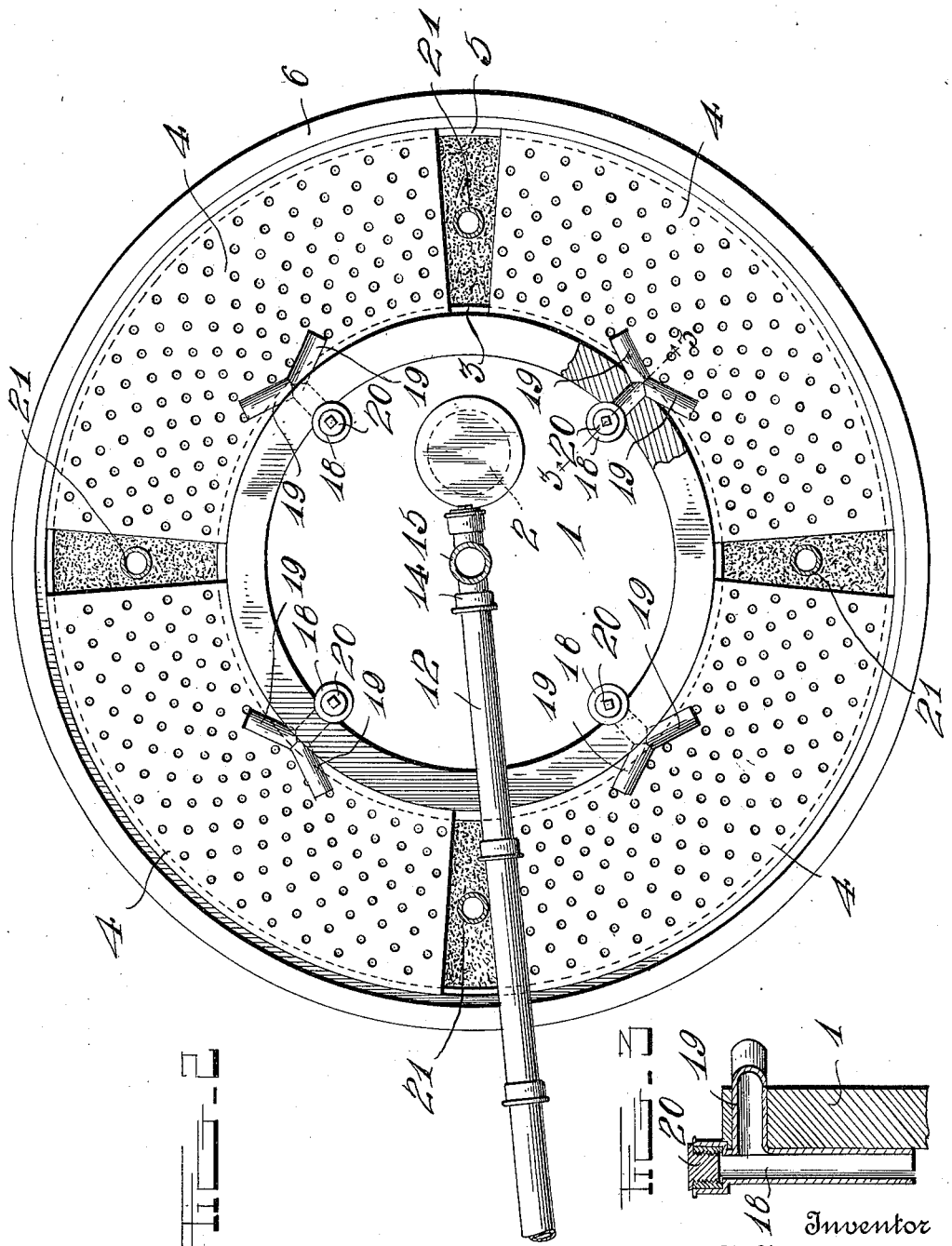

CONRAD CHRISTIAN SOFLEISS, OF RICHMOND HILL, NEW YORK.

CESSPOOL.

1,002,089.

Specification of Letters Patent. Patented Aug. 29, 1911.

Application filed December 8, 1910. Serial No. 596,352.

*To all whom it may concern:*

Be it known that I, CONRAD CHRISTIAN SOFLEISS, a citizen of the United States, residing at Richmond Hill, in the county of Queens and State of New York, have invented certain new and useful Improvements in Cesspools; and I do declare the following to be a full, clear, and exact description of the invention, such as will enable others skilled in the art to which it appertains to make and use the same.

My invention relates to cesspools or means for dispensing of sewerage or waste matters, and has for its object the provision of an inexpensive apparatus by the use of which the waste matters or sewerage may be efficiently filtered so that the liquid elements of the same may pass off into the earth in a harmless state. This object and such other incidental objects as will hereinafter appear are attained in the use of the apparatus illustrated in the accompanying drawings, and the invention consists in certain novel features of the same which will be hereinafter first fully described and then more particularly pointed out in the appended claims.

In the accompanying drawings, which fully illustrate a typical form of my invention:—Figure 1 is a vertical diametrical section of an apparatus embodying my improvements; Fig. 2 is a sectional plan view on the line 2—2 of Fig. 1; Fig. 3 is a detail section taken on the line 3—3 of Fig. 2.

In carrying out my invention, I employ a closed tank or receptacle 1, which may be of any suitable material and of any desired form or size. This tank may be cast in one integral structure, if so desired, and is provided in its upper end with a manhole 2 for inspection or repairs, as will be readily understood. This tank 1 is to be buried in the earth at a convenient depth and is provided on its outer side, near its upper end, with an annular flange or shoulder 3 to support a perforated or slotted plate 4, the outer edge of said perforated or slotted plate being supported by an annular flange or shoulder 5 on the inner surface of an outer tank or wall 6. This wall or tank 6 is to be buried in the earth at a suitable distance from the inner tank or receptacle 1, and its lower end is provided with openings 7 to permit the escape of the filtered liquid, as will be readily understood. The outer tank is bottomless, and is embedded in filtering material 8 of rather coarse material, which may be arranged to any desired depth, and is preferably carried to some distance from the outer face of the wall, as clearly shown in Fig. 1. Upon this layer 8 of filtering material are successive layers 9 of graduated filtering substances, the uppermost layer being a slight distance below the perforated plate 4. A cover or top 10 is fitted to and supported by the annular wall or outer tank 6 and is provided with a manhole 11 to permit inspection and repairs, the said manhole being preferably in vertical alinement with the manhole 2, is clearly shown, and as will be readily understood.

The inlet pipe 12, by which the waste matters are brought into the cesspool or filter, leads from the factory or other building and terminates at the center of the inner tank in a spout or outlet 13 which passes into the tank and terminates at a point below the top of the same. This outlet 13 is connected with the inlet pipe 12 by a coupling 14, one branch 15 of which extends through the cover or top 10 of the outer tank, and is provided with a suitable plug 16, or other air-tight closure, as will be readily understood.

In the drawings I have shown one side of the coupling 14 as closed by a plug 17, but it will be understood, of course, that this branch or side of the coupling may receive the end of an additional inlet pipe, so that the filter may be utilized to receive the waste products from a plurality of buildings.

The inner tank 1 is provided with a plurality of outlets 18 which may be of any desired form but are here shown as consisting of vertically disposed pipes arranged adjacent the upper end and side of the tank, and having horizontally disposed branches 19 which extend through the inner tank and terminate over the perforated or slotted plate 4, so as to discharge the liquid matter rising from the inner tank upon the said plate. The vertical pipes 18 extend through the top of the inner tank and are provided with suitable closures 20 which permit inspection, cleaning or repairing, as will be readily understood. Air tubes 21 extend from above the surface of the ground through the top or cover 10 into the outer tank and terminate within the lowermost layer of filtering material as shown, their extremities being open and provided with perforations 22 whereby air is carried to and discharged in the filtering material. An air outlet pipe 23 leads from the top or cover 10 to any convenient discharge point and may, if necessary, be equipped with any ordinary form of air suction device, it being understood that an air chamber is formed between the top of the inner tank 1 and the cover 10.

The construction and arrangement of the several parts of my apparatus being thus made known, it is thought the operation and advantages of the same will be readily understood and appreciated. The sewerage and waste matters are brought into the cesspool through the pipe 12 and discharged into the inner receptacle 1, which is entirely closed except through the outlets 18, so that the anaërobic bacteria will act on the matter discharged into the tank so as to preserve the liquid condition of the same and prevent the formation of a crust or other hard covering on the upper surface of the same. This action will be emphasized as the waste matter accumulates within the tank, for the reason that as the quantity increases the level of the same will rise so that the access of air through the vents or outlets 18 will be effectually cut off and the liquid matters will rise through the said vents and escape onto the perforated plate 4 through which they will pass in a multitude of fine streams onto the filtering bed. Fresh air being supplied to this filtering bed through the air tubes 21, the aerobic bacteria will act upon the material discharged from the inner tank, so that by the time this material has percolated to and through the bottom layer of filtering material all harmful elements will have been destroyed or eliminated, so that the resulting liquid may pass off into the ground in a harmless state without any liability of contaminating the water supply. It will thus be seen that my device may be used advantageously in those localities where the water level in the earth is rather high. The air supplied to the filtering bed through the air tubes 21 will rise through the successive layers of filtering material and escape through the plates 4 into the air chamber between the two tanks, and thence pass off through the outlet pipe 23, as will be readily understood.

The several parts of my apparatus may be constructed of any suitable material, and the size and shape may be varied to suit the requirements of any particular conditions under which the cesspool is built.

The operation will be entirely automatic, and the apparatus will need no attention except an occasional cleaning.

Having thus described my invention what is claimed is:

1. An apparatus for the purpose described comprising a closed receptacle, an outer receptacle surrounding and extending over the said closed receptacle, means for supplying air to the outer receptacle, means for discharging the matter to be treated into the inner closed receptacle, and outlets in the top of the inner receptacle discharging into the outer receptacle.

2. An apparatus for the purpose set forth comprising an inner closed receptacle, means for supplying material thereto, an outer receptacle surrounding the inner receptacle, a filtering bed disposed between the two receptacles, means for supplying air to the bottom of said filtering bed, and means for discharging the liquid constituents of the treated material from the top of the inner receptacle onto the said filtering bed.

3. An apparatus for the purpose set forth comprising an inner closed receptacle, an inlet pipe discharging into said receptacle, an outer receptacle, a filtering bed between the two receptacles, vents leading from the top of the inner receptacle and terminating within the top of the outer receptacle, perforated plates supported by and between the two receptacles immediately below the said vents, air tubes leading into the outer receptacle and terminating at the bottom thereof, and an outlet leading from the space between the tops of the two receptacles.

4. An apparatus for the purpose set forth comprising an inner closed receptacle, means for discharging material into the same, an outer receptacle surrounding said inner receptacle, a perforated plate supported by and between the upper ends of the said receptacles, a filtering bed between said receptacles below said plate, air supply tubes leading to the bottom of said filtering bed, an air escape tube leading from the top of the outer receptacle, and outlets leading from the top of the inner receptacle and terminating immediately over the said perforated plate.

In testimony whereof I have hereunto set my hand in presence of two subscribing witnesses.

CONRAD CHRISTIAN SOFLEISS.

Witnesses:
  C. WATSON WEBB,
  PETER L. MENNINGER.